April 28, 1953     I. C. MADDEN     2,636,526
SAWHORSE WORKBENCH
Filed July 18, 1950     2 SHEETS—SHEET 1
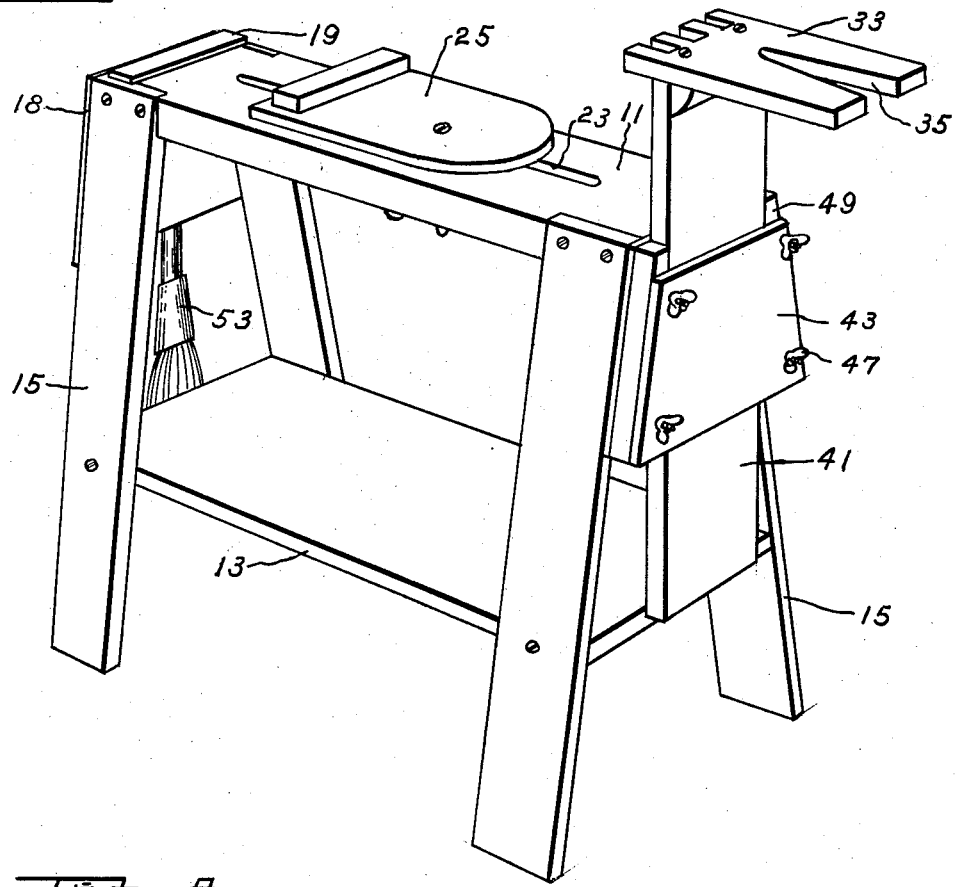
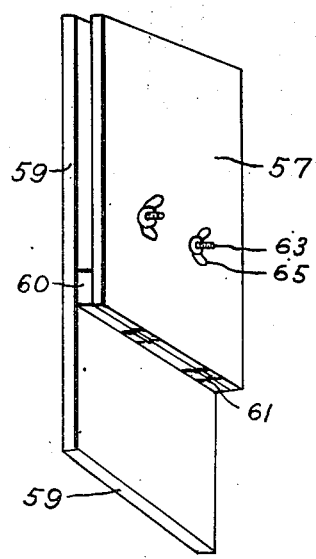
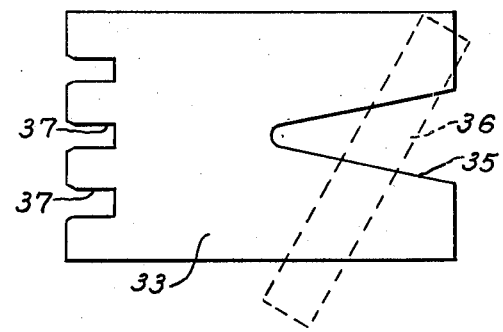
INVENTOR.
IRA C. MADDEN
BY *F. T. Hicks*
His Attorney

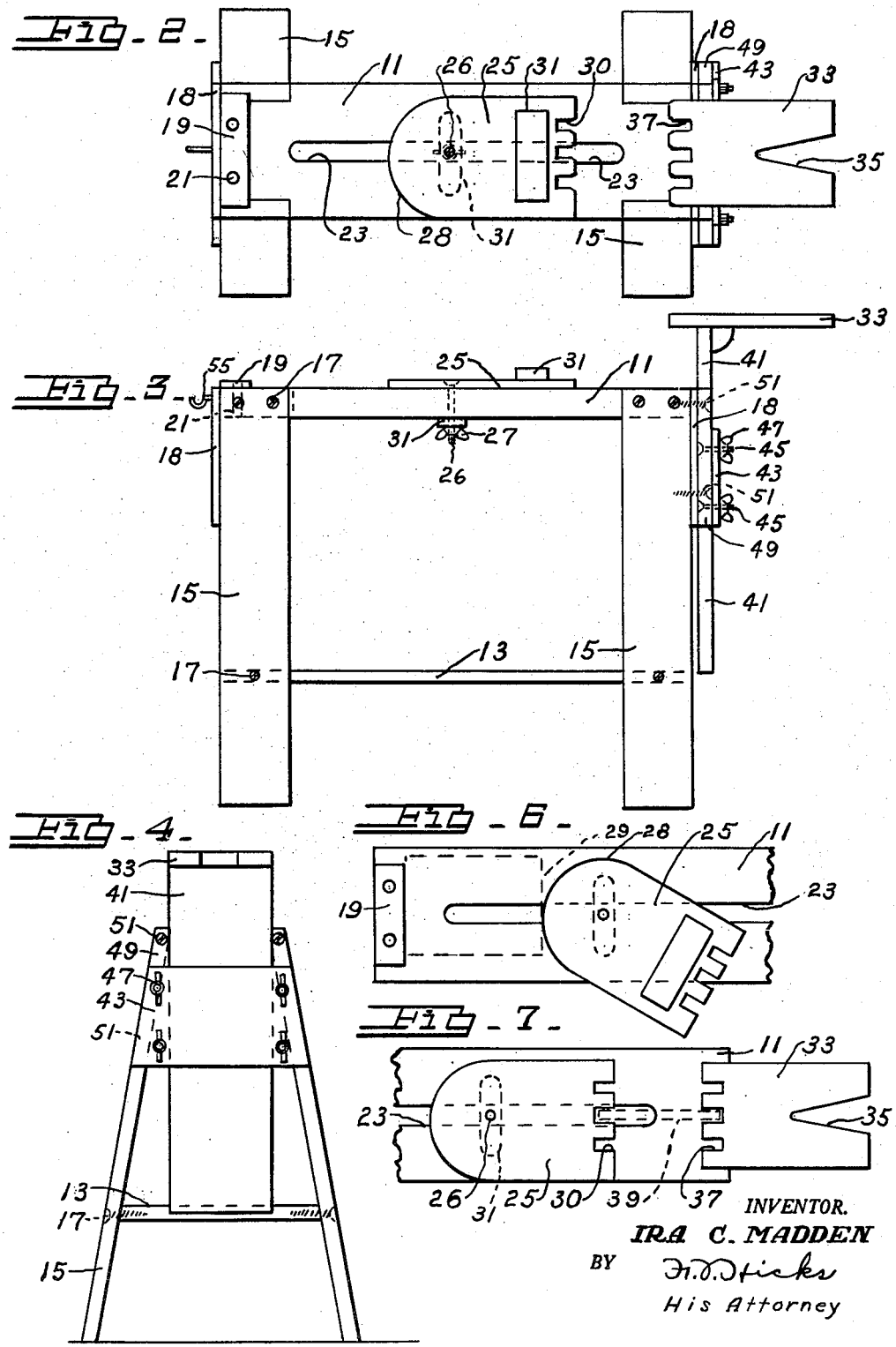

Patented Apr. 28, 1953

2,636,526

UNITED STATES PATENT OFFICE 2,636,526

SAWHORSE WORKBENCH

Ira C. Madden, Detroit, Mich.

Application July 18, 1950, Serial No. 174,405

3 Claims. (Cl. 144—286)

1

The invention pertains to work benches for holding work pieces of various material and more particularly to small handy work benches which are adaptable for a wide variety of uses.

It is an object of the invention to provide an improved work bench which is readily adaptable for holding work pieces of various materials in a wide range of positions while working thereon with various cutting, shaping and abrading tools and devices.

It is also an object of the invention to provide such a work bench in a small handy form which is convenient for use in home or school work shops.

It is also a further object of the invention to provide such a work bench which will be especially convenient and attractive to stimulate the interest and encourage children and students to learn to work with their hands at the practical crafts.

Another object of the invention is to provide such a work bench embodying a plurality of work holding members disposable in various cooperative work holding relations.

A further object of the invention is to provide such a handy work bench of a convenient small size and shape which may be straddled to serve as a resting bench for the worker while working upon work pieces held in the work holding devices thereon.

The invention will be more readily understood, and additional advantages and objects thereof will become apparent, by reading the following specification in conjunction with the appended drawings, wherein the same reference characters are applied to corresponding elements throughout, and in which:

Fig. 1 is a perspective view showing the front end and the right-hand side of the handy work bench;

Fig. 2 is a plan view thereof;

Fig. 3 is a side elevational view showing the right-hand side of the work bench;

Fig. 4 is an elevational view showing the front end of the work bench;

Fig. 5 (Sheet 1) is a diagrammatic view showing how a piece of work is placed across the top of the work holder;

Fig. 6 (Sheet 2) is a diagrammatic view showing how a board may be held flat on top of the work bench;

Fig. 7 is a similar view showing how a board may be held edgewise on the work bench; and Fig. 8 (Sheet 1) is a perspective view showing a modified work holder, in the form of a work

2 holding vise, which may be inserted into the front end of the work bench.

Referring more specifically to Figs. 1 through 4 of the drawings, an embodiment of my work bench is illustratively disclosed comprising a top plate 11 and a substantially wider shelf-board 13 of a similar length. The top plate 11 is supported by four legs 15 the upper ends of which are fitted into notches provided in the opposite side edges of the top plate adjacent the ends thereof. The legs are secured to the top plate by any suitable fastening means 17, such as screws or nails, and extend downwardly in a diverging relation with the wider shelf-board 13 secured at an intermediate position therebetween.

In addition to providing a convenient repository for tools, work pieces and materials, the shelf-board 13, by holding the legs 15 firmly in a predetermined spaced relation, also serves to make the work bench more rigid and stable. Additional strength and rigidity is provided by end pieces 18 secured across the ends.

A board holding bench stop 19 is provided across one end of the top plate for holding any board for planing as it rests flat on top of the top plate. The stop strip 19 is thinner than any board which is to be planed, so that the plane blade will not strike it, and it may be a strip of metal or strap iron, or any other suitable material. This board stop is held in place on top of the top plate 11 by means of a pair of pins 21 secured in the stop strip in a spaced relation and projecting from the underside thereof into a pair of corresponding apertures provided in the top plate of the work bench. Pins 21 fit rather loosely into the top plate of the work bench so that the stop can be easily removed or installed at any time.

A slot 23 is disposed longitudinally in the top plate 11 of the work bench for conveniently sawing a board which may rest across or lengthwise on top of the work bench. Disposed cooperatively therewith is an auxiliary work holder 25 of a substantially flat conformation for resting flat upon the top of the top plate 11 of the work bench. This auxiliary work holder 25 is secured or clamped at any desired position along the slot of the top plate by suitable pivot clamping means, such as a screw 26 passing through this holder and extending down through the slot and provided with a conveniently adjustable wing nut 27. When the wing nut is loosened, this auxiliary work holder may be moved along the slot and rotated on the screw as a pivot. By tightening up on the wing nut, the auxiliary work holder may then be clamped in any such selected position which is effective for holding the work. This operation is facilitated by providing a cross-piece 31, or a large washer, on the screw below the top plate, as will be readily understood and as represented by dotted lines in Fig. 2.

The clamping screw and pivot 26 passes through the flat auxiliary work holder 25 at a position which is eccentric in relation to the true center of the arcuate curved end 28. This arrangement provides for a useful operation, as represented in Fig. 6, where turning the holder 25 on its pivot 26 more firmly secures a board, or work piece, 29 (shown dotted), against the bench stop 19 on the rear end of the work bench.

This auxiliary work holder 25 is also provided at the end remote from the curved end, with spaced notches 30 for receiving and holding the ends of boards or other work pieces edgewise therein, in a manner to be described. Across the top of this auxiliary work holder is secured a work holding cleat 31. This is useful for sawing the end of a piece of board which may be laid thereacross and held firmly against the cleat. As such a board may extend out on either side of the work bench, this is a great convenience for both left-handed and right-handed persons.

A horizontal work table 33 is provided which may be conveniently adjusted and secured at any desirable level above the top plate for the convenience of the craftsman, who may be sitting astride the top plate of the work bench. This is convenient for various operations. For example, the worker may wish to hold a small piece of wood, plastic or other material while working upon it with a coping saw, file or other tool and the front edge of this table is provided with a cut out recess or V-shaped notch 35 where the tool may pass freely while working on the work piece, as represented in Fig. 5 where work piece 36 is represented in dotted lines. The rear edge of this work holder table is preferably also provided with a plurality of smaller spaced notches 37 and, as represented in Fig. 7, the notches 37 may receive and hold one end of any board or work piece 39 shown dotted, and the other end being held in one of the slots 30 in the auxiliary work holder. This is useful when working on the edges of such a work piece.

In order that this front end work holder table may be conveniently adjusted and set at various levels to suit the craftsman, or may be reversed to turn the V-notch to the rear, it is supported upon the upper end of a vertical slide 41 which passes down adjacent the front end of the work bench where it is clamped by a clamp board or bar 43 and screws 45 having convenient wing nuts 47. The front end piece 18 also serves as a guide board for the vertical slide board. Both the clamp board 43 and the guide board 18 extend vertically a substantial distance thereby providing an effective and firm gripping clamp for the vertical slide 41. Along the two opposite side edges of this front end piece 18, two side guides or strips 49 are secured, as by screws 51. These two side guides serve to limit the lateral movements of the vertical slide board 41, and also anchor the clamp screws 45.

The work bench is provided with a sweeping brush 53 which hangs conveniently from a hook 55 in the rear end of the work bench. The convenience and availability of such a brush encourages the development of neatness and cleanliness in the student. Also this brush hanging on the rear end of the work bench together with the elevated work holding table on the front end of the bench imparts the appearance of a horse to the entire structure. This is pleasing and fascinating to students and children who commonly refer to the auxiliary work holder as the "saddle" as they set astride the work bench.

As Fig. 8 shows, a modified front end work holder is provided comprising a vise board 57 pivotally mounted on a vertical slide board 59 by hinges 61 secured across the bottom edge and also under a strip 60 which is secured to the slide board. This clamp board 57 may be firmly drawn up to the slide board 59 by screws 63 and wing nuts 65. This work holding vise holds a wide variety of work pieces which may be operated upon by many different tools without fear of damaging the tools. The vertical slide board 59 fits into the clamp on the front end of the work bench where it may be easily and quickly adjusted and secured at the desired elevation by releasing and tightening up the previously described front wing nuts 47.

It will be seen that I have provided a handy work bench in a size and form which is convenient for use in homes or schools for practical purposes and its shape is also attractive and fascinating to interest students and children in acquiring skill and dexterity in the useful arts. Also because of its size and shape, this work bench may be utilized for all the usual purposes of an ordinary sawhorse.

What is claimed as the invention is:

1. In a small handy work bench the combination of, a narrow elongated top plate presenting a flat upper surface suitable for supporting a board to be planed in a flat horizontal position, legs extending downwardly from said top plate in a suitable spaced relation to support it in a convenient working position, a thin board holding bench stop, means for removably securing said board holding bench stop across one end of said top plate, an auxiliary work holder of a flat shape on top of said top plate and having front and back edges conformed to suitable shapes for holding work pieces, an elongated sawing slot in said top plate, a pivotal clamping screw passed through said auxiliary work holder and said slot in the top plate to hold said auxiliary work holder at various adjusted positions along the slot for holding work pieces against said bench stop, and said auxiliary work holder being eccentrically disposed relative to said pivotal clamping screw so that by rotation of said auxiliary work holder to a suitable angular position, a work piece can be forcibly engaged and held by the edge of the work holder.

2. In a small handy work bench the combination of, a narrow elongated top plate presenting a flat upper surface suitable for supporting a board to be planed in a flat horizontal position, legs extending downwardly from said top plate in a suitable spaced relation to support it in a convenient working position, a board sawing slot extending longitudinally in said top for conveniently passing the saw to saw a board resting in a firmly supported position upon the top plate of the work bench, a front end work holder embodying a vertical slide board, and a releasable clamp board extending vertically on the front end of the work bench beyond said slide board for clamping said slide board and securing said work holder adjustable to various elevations above the work bench, an auxiliary work holder, and securing means shiftably disposed in said sawing slot for securing said auxiliary work holder at any desired position therealong to cooperate with said front end work holder.

3. A small handy work bench comprising, an elongated top plate of a width to be conveniently straddled by a craftsman, four legs attached to said top plate and extending therefrom in spaced relations for supporting said top plate at a suitable elevation for the convenience of a craftsman to sit and work thereon, a horizontal work holder table having front and back edges conformed to different shapes for cooperation with work and tools, slide means extending down from said work holder table, clamping means extending a substantial distance vertically on one end of the work bench for firmly and adjustably holding said slide means to support said work holder table horizontally and turned in either direction at a desirable elevation above said top plate, an auxiliary work holder, said top plate having an elongated centrally disposed sawing slot, pivotal clamping means disposed through said sawing slot in said top plate to pivotally support said auxiliary work holder clamped at any angular and horizontal position along said sawing slot, and said auxiliary work holder being eccentrically disposed relative to said pivotal clamping means so that rotation and longitudinal shifting of said auxiliary work holder to a selected position will cause a work piece to be firmly engaged and held by and between said auxiliary work holder and said work holder table.

IRA C. MADDEN.

References Cited in the file of this patent

UNITED STATES PATENTS

| Number | Name | Date |
|---|---|---|
| 702,035 | Shaffer | June 10, 1902 |
| 756,137 | Peno | Mar. 29, 1904 |
| 891,080 | Krogh | June 16, 1908 |
| 919,546 | Davis | Apr. 27, 1909 |
| 1,191,687 | Gillett | July 18, 1916 |
| 1,290,637 | Moore | Jan. 7, 1919 |
| 1,469,860 | Walper | Oct. 9, 1923 |
| 1,552,532 | Zucker | Sept. 8, 1925 |
| 1,864,840 | Lehner | June 28, 1932 |
| 1,943,352 | Symmonds | Jan. 16, 1934 |
| 2,478,828 | Larson | Aug. 9, 1949 |
| 2,541,508 | Fleming | Feb. 13, 1951 |
| 2,544,532 | Hill | Mar. 6, 1951 |

FOREIGN PATENTS

| Number | Country | Date |
|---|---|---|
| 462,681 | Germany | July 16, 1928 |
| 543,972 | France | June 13, 1922 |